(12) United States Patent
Kodintsev

(10) Patent No.: US 12,719,988 B2
(45) Date of Patent: Aug. 25, 2026

(54) SYSTEMS AND METHODS FOR AUTOMATICALLY UNMUTING CONFERENCE PARTICIPANTS

(71) Applicant: RingCentral, Inc., Belmont, CA (US)

(72) Inventor: Aleksandr Kodintsev, Buenos Aires (AR)

(73) Assignee: RingCentral, Inc., Belmont, CA (US)

(*) Notice: Subject to any disclaimer, the term of this patent is extended or adjusted under 35 U.S.C. 154(b) by 185 days.

(21) Appl. No.: 18/478,866

(22) Filed: Sep. 29, 2023

(65) Prior Publication Data

US 2025/0112993 A1 Apr. 3, 2025

(51) Int. Cl.
*H04M 3/56* (2006.01)

(52) U.S. Cl.
CPC ........... *H04M 3/568* (2013.01); *H04M 3/563* (2013.01)

(58) Field of Classification Search
CPC ......... H04L 12/18; G10L 17/00; G10L 17/06; H04M 2203/50; H04M 2203/5009; H04M 3/356; H04M 3/568
USPC .......................................... 379/202.01, 88.02
See application file for complete search history.

(56) References Cited

U.S. PATENT DOCUMENTS 8,515,025 B1 * 8/2013 Hewinson ............... H04M 3/56 379/88.19
9,936,078 B2 4/2018 Rose et al.
12,192,018 B1 * 1/2025 Roper ..................... H04L 12/18
2013/0143539 A1 * 6/2013 Beccay et al. .......... H04W 4/16
2015/0154960 A1 * 6/2015 AI et al. ................. H10L 17/00
2021/0399911 A1 * 12/2021 Jorasch et al. .......... H04L 12/18
2023/0125307 A1 * 4/2023 O'Connell et al. ..... G10L 17/06
2023/0129467 A1 * 4/2023 Singh ...................... G10L 17/02
2023/0133750 A1 * 5/2023 Shayne et al. ........... H04N 7/15

* cited by examiner

*Primary Examiner* — Ahmad F. Matar
(74) *Attorney, Agent, or Firm* — Ansari Katiraei LLP; Arman Katiraei; Sadiq Ansari

(57) ABSTRACT

Disclosed is a conference system and associated methods for automatically controlling the audio in a conference involving multiple participants. The system receives and analyzes the audio streams associated with each of the participants. The system detects an identifier that is mentioned in the audio of a first audio stream, determines a context with which the identifier is mentioned in the audio of the first audio stream, and unmutes a second audio stream in response to the identifier being linked to the second audio stream and further in response to the context from the audio of the first audio stream specifying a request that a user associated with the second audio stream speak.

20 Claims, 7 Drawing Sheets

SYSTEMS AND METHODS FOR AUTOMATICALLY UNMUTING CONFERENCE PARTICIPANTS

TECHNICAL FIELD

The present disclosure relates generally to the field of audio and video conferencing. Specifically, the present disclosure relates to systems and methods for automated muting and unmuting of different conference participants based on context in the active audio feed.

BACKGROUND

Audio and/or video conference solutions allow two or more users to collaborate, share information, and/or otherwise communicate. Mute and unmute functionality is a common feature for disabling and enabling the microphone and/or the audio of one or more of the users.

The mute and unmute functionality may be used to prevent background noise, side conversations, and/or other unwanted audio from entering into the active audio feed that is provided and played back on the connected user devices. However, manual control over the mute and unmute functionality may lead to unintended consequences when a speaker forgets to unmute themselves prior to speaking or when a user has a side conversation forgetting that they are not muted.

In some instances, a host controls the muting and unmuting of the conference participants. The host manually mutes and unmutes each participants when it is their turn to speak. With some conferences having tens or hundreds of participants, the host may have difficulty quickly finding and unmuting the participant that speaks or is requested to speak. The delays caused by the host or entity with control over the muting and unmuting of the conference participants may create numerous disruptions and distractions throughout the conference.

DETAILED DESCRIPTION OF PREFERRED EMBODIMENTS

This disclosure arises from the realization that conferences with remote participants suffer many avoidable interruptions, distractions, and delays because the audio feed of each remote participant is subject to manual control. For instance, unmuted audio feeds may introduce unwanted noise that interfere with the audio feed of a primary speaker, and muted audio feeds may result in an active speaker not being heard.

The current disclosure provides a technological solution to the technological problem of automatically controlling the audio feed in a conference with multiple participants. The technological solution automates control over the audio feed by using different artificial intelligence and/or machine learning ("AI/ML") techniques to detect when the name or other identifier associated with a particular participant is mentioned in the active audio feed, determine context associated with the mention of the particular participant, determine the device used by the particular participant to engage in the conference, and automatically unmute the audio feed from the determined device used by the particular participant in response to the context corresponding to a question, prompt, or other queue for the particular participant to speak.

The technological solution frees the conference host and individual participants from manually unmuting and/or muting themselves before and after speaking. The technological solution ensures that the active audio feed of the conference is uninterrupted and clear of background noise or audio from unmuted participants that are not selected or requested to speak.

The technological solution uses the different AI/ML techniques to accurately and intelligently perform the automated muting and unmuting, thereby avoiding unintentionally unmuting a conference participant simply because the name or identifier of the conference participant is mentioned by another or while the speaker that mentioned the conference participant is still speaking. More specifically, the AI/ML techniques analyze the context surrounding the mention of a conference participant as part of the automated control over the muting and unmuting of the audio from different conference participants. For instance, a conference system, that implements the automated control over the muting and unmuting of the conference participants, analyzes the context around or associated with the mention of a participant name or identifier in the active audio feed in order to determine when the current speaker has finished speaking to prevent the mentioned participant from interrupting or speaking over the current speaker, and to further determine if the mentioned participant is requested, called on, or otherwise prompted to speak by the current speaker.

Figure 1:
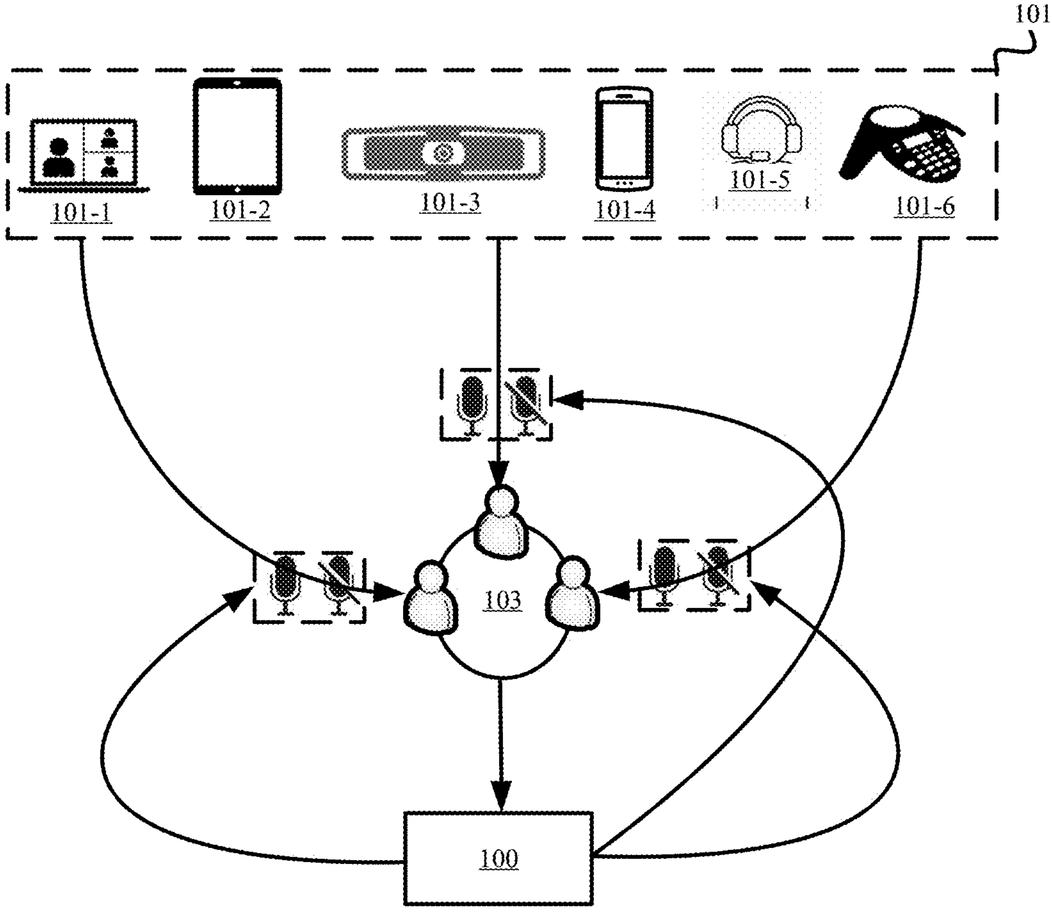
FIG. 1 illustrates an example architecture for a conference system that implements automated muting and unmuting of conference participants in accordance with some embodiments presented herein.

FIG. 1 illustrates an example architecture for conference system 100 implementing the automated muting and unmuting of conference participants in accordance with some embodiments presented herein. Conference system 100 integrates with conference devices 101 and/or conference service provider 103.

Conference devices 101 include the devices with which conference participants join and participate in a conference. Conference devices 101 include microphones for capturing audio, and speakers for playing back audio. Conference devices 101 may further include cameras for capturing video, and displays for presenting images or video of other conference participants. Processor, memory, storage, network, and/or other hardware resources of conference devices 101 may be used to connect one or more users to a conference, encode and distribute audio and/or video streams from the local users to the conference, and/or receive, decode, and playback audio and/or video from other users that are connected to the conference. Accordingly, conference devices 101 may include desktop or laptop computers 101-1, tablet devices 101-2, conferencing console 101-3, smartphone devices 101-4, telephony devices 101-5, and/or other conferencing equipment 101-6 (hereinafter collectively referred to as "conference devices 101" or individually as "conference device 101").

Conference service provider 103 establishes the connectivity between different conference devices 101, combines the audio and/or video streams from the connected conference devices 101, and distributes the combined streams for playback on the connected conference devices 101. For instance, conference devices 101 submit requests to join a particular conference that is identified with a unique Uniform Resource Locator ("URL"), name, or another identifier and that is hosted by conference service provider 103. The requests may include the names, identifiers, and/or login information for the one or more users using conference devices 101 to join the particular conference. Conference service provider 103 authorizes access to the particular conference based on stored or configured information about the users or conference devices 101 that are permitted to join the particular conference, created accounts that identify the users, and/or other identifying information that is sent with the requests (e.g., names, identifiers, login information, network addressing, port numbers, device signatures, etc.).

Conference service provider 103 may multiplex the streams from the different conference devices 101 that are connected to the same conference, and may create a unified stream that is provided to each conference device 101. The unified stream may synchronize the audio and/or video from the different contributing streams, enhance the stream quality, enforce access controls (e.g., who is allowed to speak, which streams are muted, etc.), and dynamically adjust stream quality based on the quality of the network connection to each conference device 101.

Integrating conference system 100 with conference devices 101 and/or conference service provider 103 includes providing the conference streams or a copy of the conference streams to conference system 100. In some example embodiments, conference system 100 receives the unified stream that is generated for a particular conference by a particular conference service provider 103 based on the individual streams from each of the conference devices 101 that are connected to that particular conference. In some other embodiments, conference system 100 receives the individual streams from each of the conference devices 101 that are connected to the same conference. The streams include the encoded audio and/or video from each conference participant.

The integration of conference system 100 with conference devices 101 and/or conference service provider 103 may also provide conference system 100 with account information, metadata, and/or other user identifying information associated with each of the streams or conference participants. For instance, conference system 100 obtains session information associated with each stream or conference. The session information may include the Internet Protocol ("IP") addresses, port numbers, and/or other device identifying information associated with each conference device 101 that is a connected endpoint to a conference. The session information may include the account information used by each conference device 101 to join a conference. The account information may include the email address, username, or other user identifying information (e.g., other user identifiers) that is provided by a user as part of the user joining the conference, that is used to authorize the user for access to the conference, or that identifies the user during the conference.

Conference system 100 executes on one or more devices or machines that are part of or separate from the devices or machines of conference service provider 103. In some example embodiments, conference system 100 is a centralized system that performs the automated muting and unmuting of conference participants for different conferences hosted by conference service provider 103. In some other embodiments, conference system 100 is a localized system that performs the automated muting and unmuting on-premises or in the private cloud or network of a specific organization or entity.

Conference system 100 receives different conference audio and/or video streams and supplemental information that is associated with the conference streams from conference devices 101 and/or conference service provider 103. The supplemental information may include account information, metadata, and/or user identifying information for the conference participants.

Conference system 100 may use one or more AI/ML techniques to associate the name or other identifier of a conference participant to an audio stream originating from the conference device 101 of that conference participant. For instance, the AI/ML techniques may perform voice recognition to match the speaker's voice in an audio stream to a voice signature of a previously identified or registered user, may analyze the audio streams to detect user introductions (e.g., "Hi, Bob is here.") that may be associated with a name or other identifier of a previously identified user or registered user, and/or may analyze the audio streams to detect a greeting that identifies a user in one audio stream and another audio stream that responds to the greeting (e.g., "How are you Jim?" in a first audio stream and "I'm doing well." in a second audio stream"). Additionally, the AI/ML techniques may perform facial recognition in a video stream that is associated with an audio stream to identify the conference participant that is speaking in that audio stream, or may define a unique user signature that identifies a user based on hardware and/or software identifiers of the microphone, camera, attached peripherals, and/or the device with the conference equipment. The AI/ML techniques may generate different associations between a conference participant identifier and one of the many conference audio streams.

In some example embodiments, conference system 100 uses the one or more AI/ML techniques to determine the phonetic equivalent of the name or identifier by which each conference participant is identified in the conference, and to associate the phonetic equivalent of the identifying name or identifier to the audio stream identified by that identifying name or identifier. For instance, the name of a first conference participant is displayed as "Bob". The AI/ML techniques convert the textual name to sound (e.g., the audio equivalent of the name), and associate the sound for the name to the audio stream of the first conference participant.

In some example embodiments, conference system 100 uses the one or more AI/ML techniques to analyze the audio feeds from each conference device 101 that connects to a particular conference. The audio feed analysis may include detecting mentions of participant names or identifiers, and associating the mentioned name or identifier to the audio stream that responds to the mention of the name or identifier or to the audio stream that contains a greeting or introduction of that name or identifier. For instance, a first audio stream includes the audio for "Hi, this is Bob." A second audio stream includes the audio for "Hi Jill, how are you?" A third audio stream includes the audio for "I'm doing well, thanks." Conference system 100 uses the AI/ML techniques to analyze the audio streams (e.g., the participant names or identifiers and the surrounding context), associate the phonetic equivalent of "Bob" to the first audio stream, and associate the phonetic equivalent of "Jill" to the third audio stream based on the analysis.

In some example embodiments, conference system 100 uses the one or more AI/ML techniques to match a speaker's voice characteristics to a voice signature and associate the phonetic equivalent of a name or identifier that is linked to the voice signature to the speaker's audio stream. For instance, conference system 100 receives a fourth audio stream with the audio "Let's get started." Conference system 100 uses the AI/ML techniques to extract voice characteristics of the speaker (e.g., tone, pitch, accent, frequency, etc.), and to match the voice characteristics to the voice signature of a conference participant identified as "Susan". Conference system 100 associates the name Susan or the phonetic equivalent to the fourth audio stream.

In some example embodiments, conference system 100 uses the one or more AI/ML techniques to match a speaker's face or visual appearance to a stored image and associate a name or identifier that is linked to the stored image to that speaker's audio stream. For instance, conference system 100 may receive a video stream with an audio stream. Conference system 100 may perform facial recognition over the images of the video stream against a stored library of user images, may detect a speaker in the video stream matches the image of a particular user, and may attribute the name or identifier that is stored with the image of the particular user to the audio stream.

In some example embodiments, conference 100 uses the one or more AI/ML techniques to uniquely identify speakers based on one or more device identifiers. The AI/ML techniques detect identifiers for the microphone, camera, device, and peripherals or other hardware that may be attached to the device, and determine if some combination of the identifiers uniquely identify a speaker. The identifiers may include model or version numbers of the hardware and/or software provided by a user device when connecting to different conferences. The AI/ML techniques may determine a pattern of the same speaker connecting to different conferences with a unique combination of hardware and/or software identifiers, and may associate the speaker name or other identifier to that unique combination of hardware and/or software identifiers so that the speaker may be identified in subsequent conference based on that unique combination of hardware and/or software identifiers.

Conference system 100 uses the established associations between the names or identifiers and the different audio streams of a conference to perform the automated audio control and/or automated muting and unmuting of the audio streams. Performing the automated audio control includes detecting the mention of a particular name or identifier in a first audio stream that is associated with a user of a second audio stream, determining the context around the detected mention of the particular name or identifier, classifying the context as either a request for the mentioned participant to speak or as a mention that is disassociated from a speaking request, and automatically unmuting the second audio stream that is associated with the particular name or identifier in response to classifying the context as request or prompt for the user associated with the particular name or identifier to speak. Conference system 100 may monitor the audio stream to subsequently mute the audio stream when the speaker has finished speaking.

In some example embodiments, conference system 100 calls application programming interface ("API") functions of conference service provider 103 that control the muting and unmuting of the audio streams. In some example embodiments, conference system 100 issues commands directly to each conference device 101 that enable or disable the microphone or audio stream of the receiving conference device 101.

In some example embodiments, conference system 100 embeds an audio controller as part of the audio multiplexing service of conference service provider 103. The audio multiplexing service may combine the audio streams from each conference device 101 that is connected to a common conference in order to generate an active audio feed that plays back the combined audio streams on each conference device 101. In some such embodiments, the audio controller controls which of the audio streams are combined or included as part of the active audio feed based on the detected mentions and context determined from the audio feed analysis.

Figure 2:
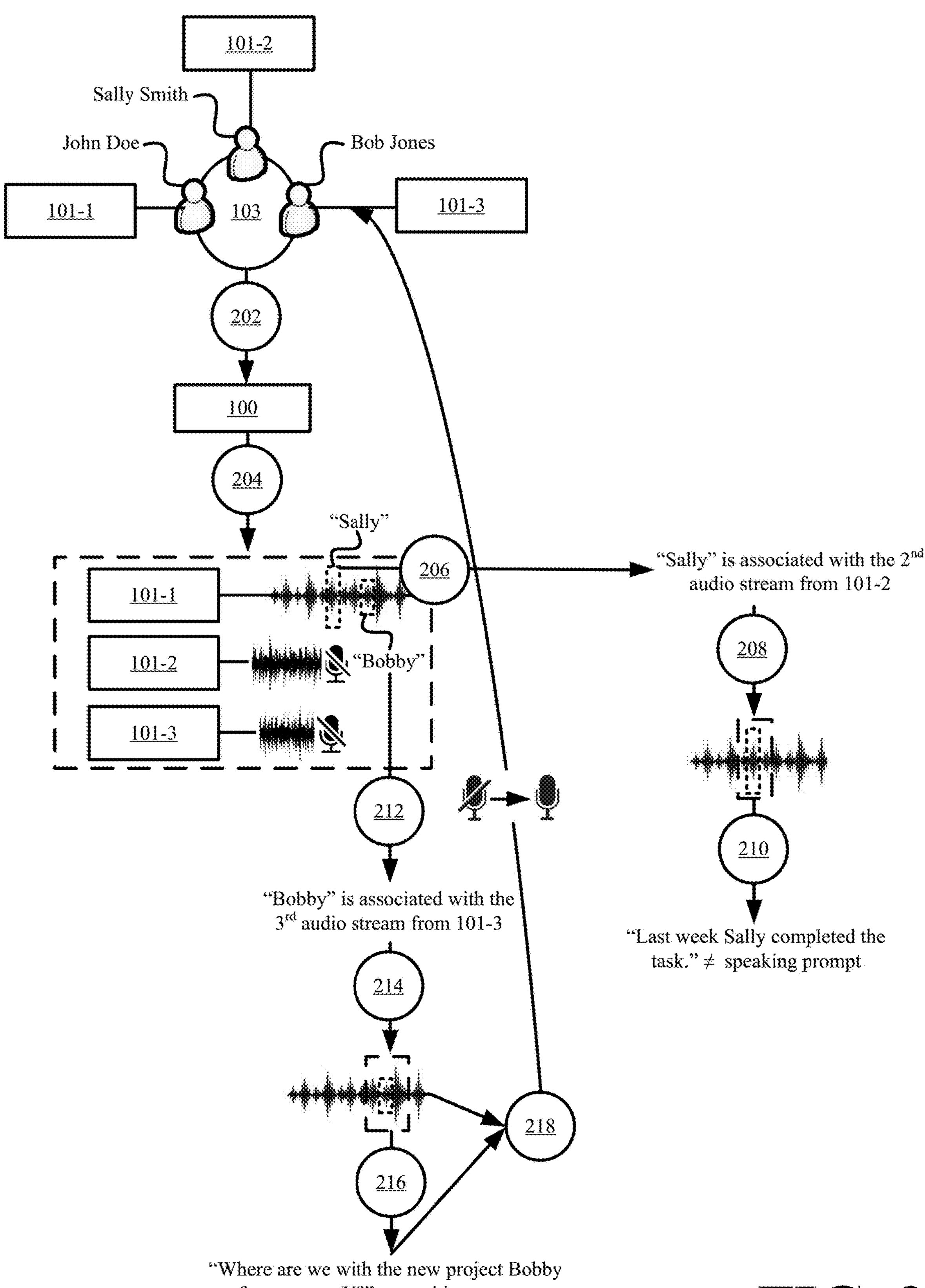
FIG. 2 illustrates an example of the context-based automated muting and unmuting of conference participants in accordance with some embodiments presented herein.

FIG. 2 illustrates an example of the context-based automated muting and unmuting of conference participants in accordance with some embodiments presented herein. First conference device 101-1, second conference device 101-2, and third conference device 101-3 join a particular conference. Different users use conference devices 101 to participate in the particular conference, and each user is identified with a textual identifier in a user interface that is presented on all conference devices 101.

Conference system 100 receives (at 202) the audio stream from each conference device 101. Initially or after some elapsed time, the audio streams from second conference device 101-2 and third conference device 101-3 may be muted. In some example embodiments, the users associated with second conference device 101-2 and third conference device 101-3 may manually mute the audio streams or the microphones associated with second conference device 101-2 and third conference device 101-3. In some example embodiments, the user associated with first conference device 101-1 may be the conference host and may mute the audio streams from second conference device 101-2 and third conference device 101-3 once the particular conference starts or an introductory portion of the particular conference ends. In some example embodiments, conference system 100 may automatically mute the audio streams from second conference device 101-2 and third conference device 101-3 when the particular conference commences or when the introductory portion of the particular conference ends.

Conference system 100 analyzes (at 204) the received (at 202) audio streams for mentions of a participating user. The mentions may correspond to the names, nicknames, or other identifiers that conference system 100 has associated to each of the participating users. The identifier-to-user association may be based on the textual identifier that a participating user uses to identify themselves in the conference, a nickname that is linked to the textual identifiers, identifiers that conference system 100 detects during an introductory phase of the particular conference in which the users verbally introduce themselves and/or greet one another, and/or matching of speaker voices to voice signatures of previously identified users.

Conference system 100 detects (at 206) a name or identifier that is associated with the second audio stream coming from second conference device 101-2 or with a first user connecting to the particular conference via second conference device 101-2. Conference system 100 does not immediately activate or unmute the audio stream of second conference device 101-2 in response to detecting (at 206) the name or identifier of the first user associated with the second audio stream or second conference device 101-2.

Instead, conference system 100 analyzes (at 208) the context around the mention of the first user. Analyzing (at 208) the context may include performing a speech-to-text transcription of the audio around the mention of the first user, and/or parsing the transcribed text or dialog to determine if the first user was mentioned in the context of a question, prompt, signal, or other request for the first user to speak. For instance, conference system 100 may analyze (at 208) the inflection, tone, sentence structure, spoken words, and/or properties of the dialog from the current speaker surrounding the mention of the first user to determine if the current speaker requests or prompts the first user to speak.

Conference system 100 determines (at 210) that the context surrounding the mention of the first user is not a speaking prompt or request directed to the first user. Accordingly, conference system 100 does not unmute the second audio stream from second conference device 101-2.

Conference system 100 detects (at 212) a name or identifier that is associated with a second user connecting to the particular conference via third conference device 101-3 in the active audio stream from first conference device 101-1.

Conference system 100 analyzes (at 214) the context around the mention of the second user and determines (at 216) that the context is a prompt or request for the second user to speak. Conference system 100 continues analyzing the active or unmuted audio stream of first conference device 101-1 to determine when the current speaker has concluded speaking. Conference system 100 unmutes (at 218) the audio stream from third conference device 101-3 that is associated with or being used by the second user to participant in the particular conference in response to associating the mentioned second name or identifier to the second user that is associated with third conference device 101-3, determining that the context is a prompt or request for the second user to speak, and/or determining that the current speaker has stopped speaking.

In some example embodiments, unmuting (at 218) the audio stream from third conference device 101-3 includes conference system 100 issuing a command to third conference device 101-3 that unmutes the microphone or audio recording of third conference device 101-3. In some example embodiments, unmuting (at 218) the audio stream from third conference device 101-3 includes activating or enabling the audio stream from third conference device 101-3 so that it is multiplexed or combined with the audio stream from unmuted first conference device 101-1 as part of the active audio stream that is distributed to and played back on all conference devices 101 that connected to the particular conference.

Prior to or contemporaneous with unmuting (at 218) the audio stream from third conference device, conference system 100 may provide a notification to the third conference device 101-3 that alerts the user that they have been automatically unmuted. In some example embodiments, conference system 100 presents an icon, message, or other indicator in a user interface or display of third conference device 101-3 that notifies the user that their microphone has been unmuted.

Conference system 100 may define multiple associations between a user identifier and a conference participant to accurately identify the conference participant. In some example embodiments, conference system 100 defines the multiple associations for a single participant in order to identify that participant when the participant connects to different conferences with different conference devices 101, connects to or is identified in a conference with an identifier that is different than their name or how others refer to that participant, is referred to with different nicknames, and/or joins a conference with other participants that have the same name.

Figure 3:
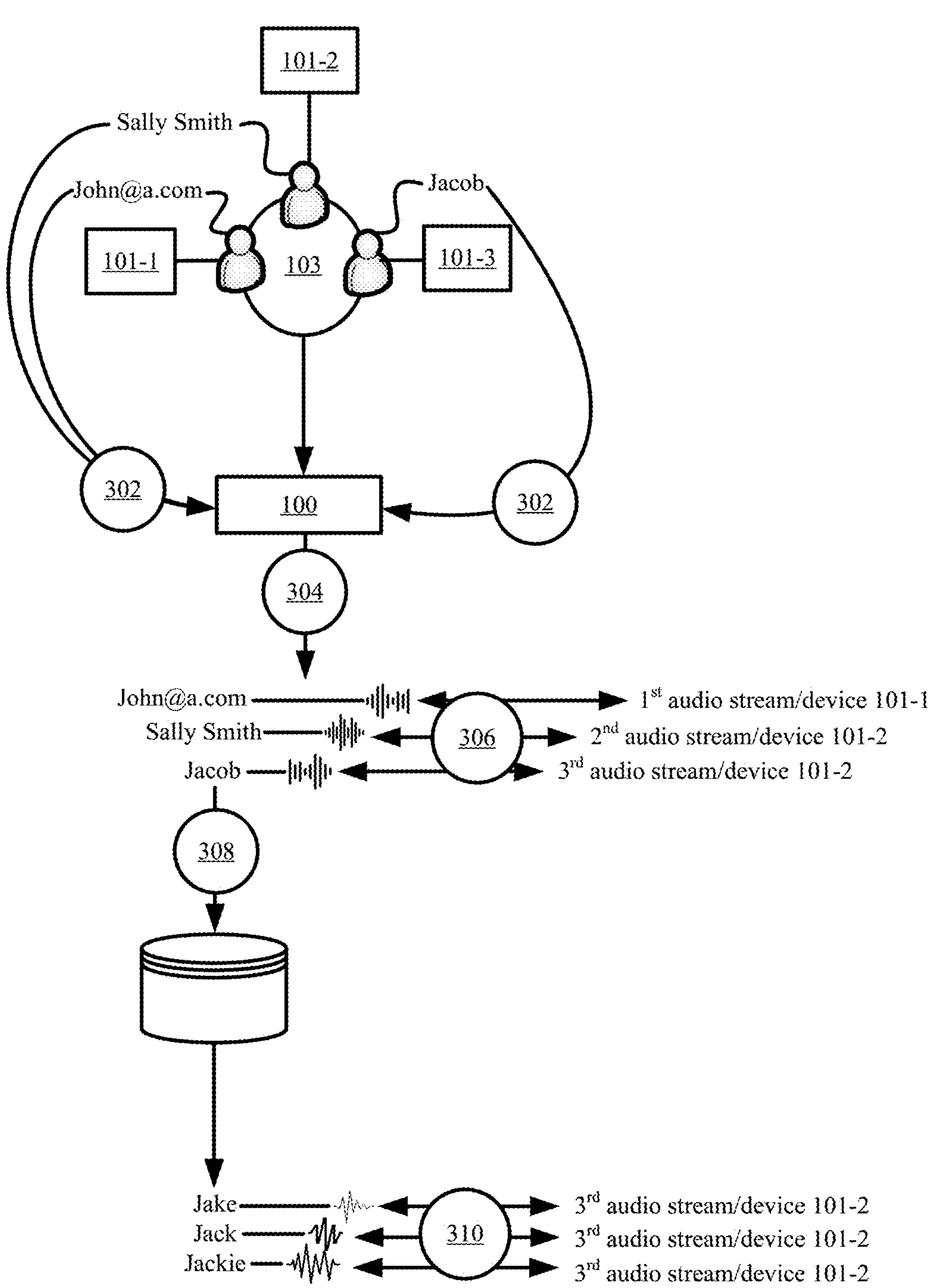
FIG. 3 illustrates the association of one or more identifiers to a conference participant in accordance with some embodiments presented herein.

FIG. 3 illustrates the association of one or more identifiers to a conference participant in accordance with some embodiments presented herein. When joining a conference, users typically provide an identifier that is displayed to other conference participants. The identifier may correspond to the participant name, nickname, email address, profile, conferencing platform account, associated device, associated internet protocol (IP) address, biometrics, facial recognition, or other input provided by the participant prior to or as part of joining the conference. For instance, conference service provider 103 may prompt the user to input a name that is to be presented to the other conference participants. Alternatively, the user may provide login information to join the conference. The login username may be presented to the other conference participants, or the login information may be used to access a user profile that contains a picture or identifier that is presented to the other conference participants.

Conference system 100 receives (at 302) the identifier of each conference participant and performs (at 304) a text-to-speech conversion of each identifier in order to obtain the sound characteristics of the identifier. Conference system 100 may recognize identifiers that are formatted as email addresses, and may perform (at 304) the text-to-speech conversion for the user identifying portion of the email address.

Conference system 100 associates (at 306) the sound characteristics of each identifier to the participant that is identified with that identifier, conference device 101 used by the participant, or the audio stream generated from conference device 101 of the identified participant. When the identifier is spoken in a conference, conference system 100 may match the spoken dialog to the sound characteristics of that identifier and may identify which conference participant is mentioned based on the association between the identifier sound characteristics and the conference participant.

Conference system 100 may also build a library of nicknames or other identifiers that are linked to a particular identifier and may associate the sound characteristics of the nicknames or other identifiers to the participant or user identified with the particular identifier. For instance, a user may join a conference and use the textual identifier "Jacob" to identify themselves to other users. Conference system 100 may perform a lookup of the textual identifier against a library of nicknames, and may determine (at 308) that the textual identifier is commonly associated with the nicknames of "Jake", "Jack", and "Jackie". Conference system 100 associates (at 310) the sound characteristics of each of the identified nicknames of "Jake", "Jack", and "Jackie" to the same participant. As additional examples, the sound characteristics associated with the name "Charles" may be associated with the nickname "Chuck" and the sound characteristics associated with the name "Richard" may be associated with the nickname "Dick". In some example embodiments, the nicknames may be stored in a user account or profile, and may be accessed using the textual identifier or login information provided by a conference participant when joining a conference.

In some example embodiments, conference system 100 may receive the audio streams during an introductory period of a conference when all participants freely communicate and/or prior to the official business of the conference starting. For instance, the introductory period of a conference may be the period before the start of the conference when different conference participants join the conference, introduce themselves to the other conference participants, greet each other, and/or engage in small talk with one another. The conference introductory period provides conference system 100 sufficient audio samples from which to create or define the identifier-to-participant associations. For instance, conference system 100 may detect the audio sample in a first audio stream "Hi, John. How have you been?" and may detect a second audio stream that becomes active and responds "I'm good Bill. How are you?". From this quick exchange, conference system 100 may detect the participant identifiers John and Bill and may define a first association between the participant identifier of John and the user associated with the second audio stream, and a second association between the participant identifier of Bill and the user associated with the first audio stream.

Figure 4:
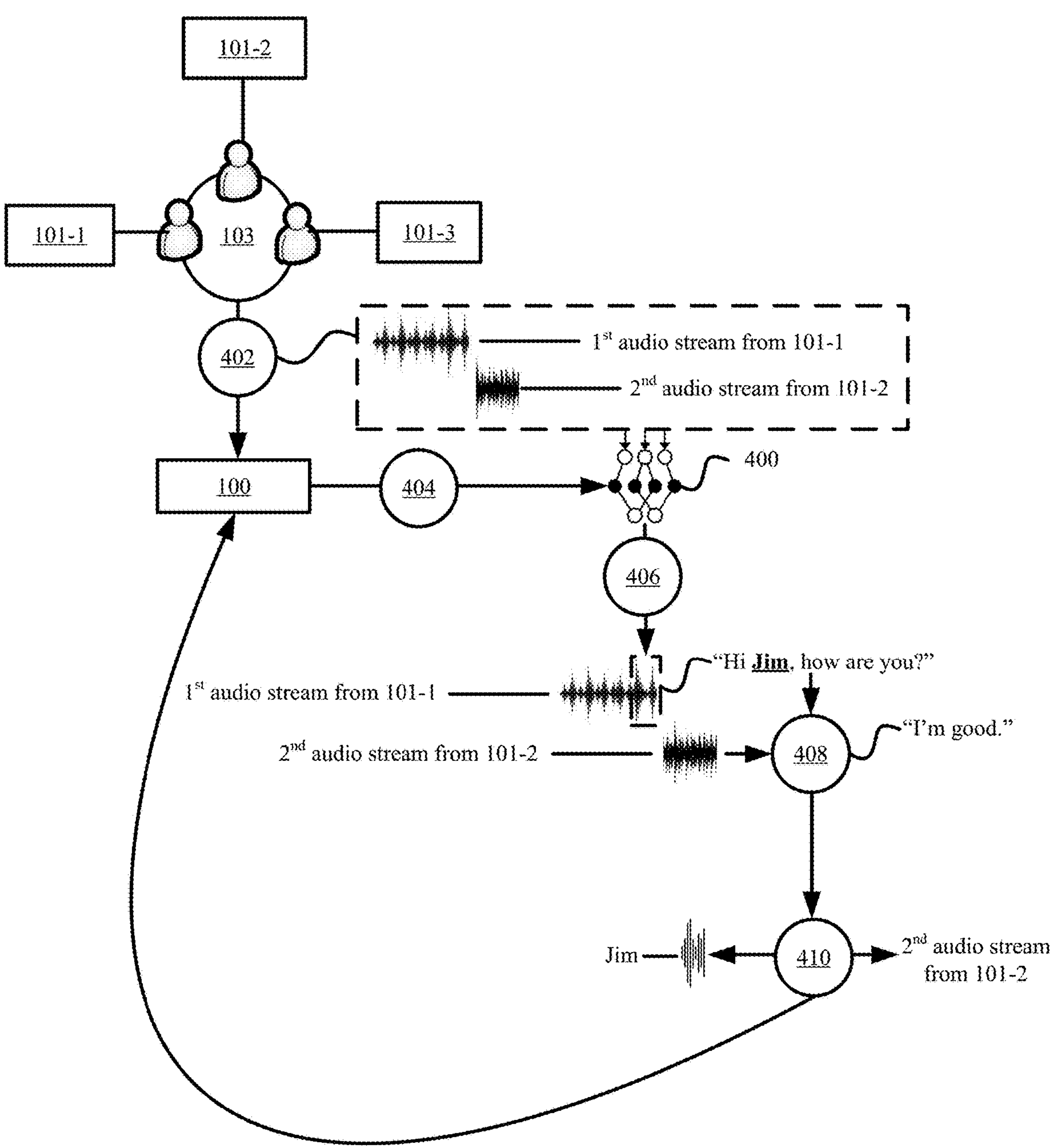
FIG. 4 illustrates an example of deriving the identifier-to-participant associations from the conference audio in accordance with some embodiments presented herein.

FIG. 4 illustrates an example of deriving the identifier-to-participant associations from the conference audio in accordance with some embodiments presented herein. Conference system 100 receives (at 402) the audio streams from different conference devices 101 that are connected to a common conference.

Conference system 100 inputs (at 404) the audio streams from the different conference devices 101 to AI/ML classifier 400. AI/ML classifier 400 detects (at 406) when a user identifier is spoken in one audio stream and determines (at 408) which audio stream from another conference device 101 or audio stream that is associated with another user becomes active after that user identifier is detected (at 406). The detected (at 406) user identifier may be a word without a dictionary definition and that corresponds to a name. In some example embodiments, the user identifier may be compared against a registered user directory of names and matched to a particular name. AI/ML classifier 400 creates or defines (at 410) an association between the detected user identifier and the audio stream of the user or conference device 101 that responds or becomes active after the detected user identifier is detected in another audio stream.

Conference system 100 may receive the associations created or defined (at 410) by AI/ML classifier 400, and may store the associations with a unique identifier that a user uses to join different conferences or a unique conference device signature. For instance, conference system 100 may associate the sound characteristics for "Jim", "Jimmy", "James" to a single email address or username used by a particular user to join different conferences or to a unique device signature of conference device 101-2 used by the particular user to join the different conferences. The unique device signature may be a unique combination of the network address, port, user agent, location, and/or values associated with the conference device.

In some example embodiments, conference system 100 stores a voice signature or audio sample of a participant that is identified by a particular identifier for subsequent identification of that participant based on their voice. For instance, a first audio stream may contain the dialog "Hi Sally, how are you?", and a second audio stream may become active and respond "I'm fine. Thank you." AI/ML classifier 400 defines an association between the identifier of Sally and the user or conference device 101-2 associated with the second audio stream. Conference system 100 may also store the audio sample spoken by Sally (e.g., "I'm fine. Thank you.") and/or voice characteristics (e.g., tone, pitch, accent, frequency, etc.) that are derived from the audio sample so that the next time the user identified as Sally speaks in a different conference, conference system 100 may match the speaker's voice or voice characteristics to the audio sample and determine that the speaker is Sally without the name or identifier of Sally being spoken in the different conference.

Figure 5:
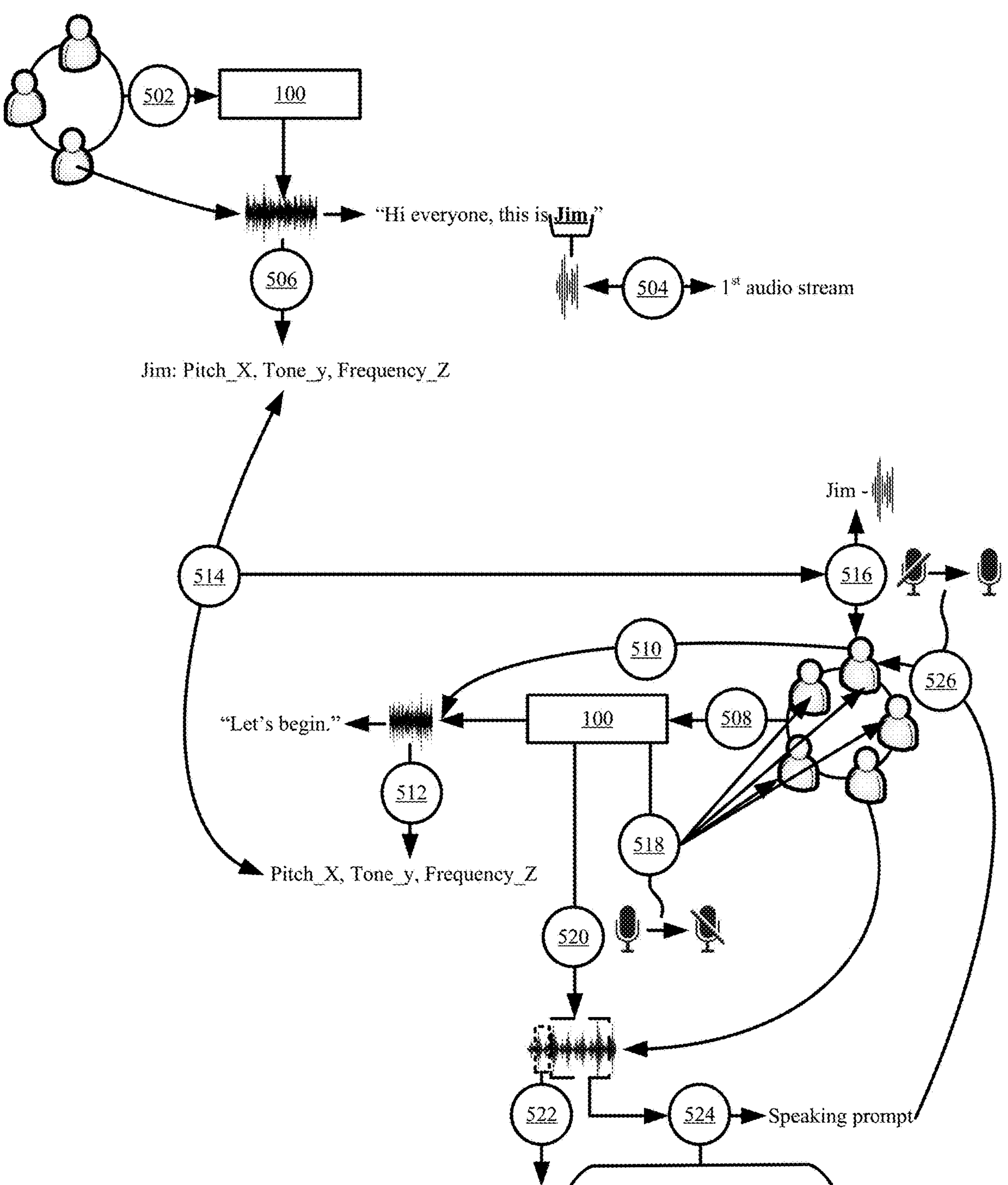
FIG. 5 illustrates an example of associating user identifiers to audio conference streams by matching speaker voices to stored voice characteristics in accordance with some embodiments presented herein.

FIG. 5 illustrates an example of associating user identifiers to audio conference streams by matching speaker voices to stored voice characteristics in accordance with some embodiments presented herein. Conference system 100 receives and analyzes (at 502) the audio streams of a first conference. During an introductory period of the first conference, the first conference participants introduce themselves.

In a first audio stream of the first conference that becomes active, conference system 100 detects the identifier of Jim, analyzes the surrounding context to determine that the identifier is used to identify the speaker and not another conference participant associated with another audio stream of the first conference, and associates (at 504) the identifier of Jim to the first audio stream of the first conference. Conference system 100 also stores (at 506) the voice signature or voice characteristics for Jim based on the audio sample "Hi everyone, this is Jim." Specifically, conference system 100 may use one or more AI/ML techniques to detect the pitch, tone, frequency, intensity, accent, and/or other voice characteristics from the voice sample, and to define an association between the detected voice characteristics and the identifier for Jim.

Conference system 100 receives and analyzes (at 508) the audio streams of a second conference that occurs after the first conference has concluded. Conference system 100 detects a particular audio stream from the second conference that becomes active. Conference system 100 records or extracts (at 510) an audio sample from the particular audio stream with the spoken phrase "Let's begin."

Conference system 100 analyzes the audio sample to determine (at 512) the voice characteristics or voice signature of the speaker. For instance, conference system 100 measures the tone, pitch, frequency, and/or other voice characteristics of the speaker in the extracted (at 510) audio sample. In some example implementations, conference system 100 may use one or more signal processing techniques to determine (at 512) the voice characteristics.

Conference system 100 matches (at 514) the determined (at 512) voice characteristics to the stored (at 506) voice signature for the user identified as Jim. In response to matching (at 514) the voice characteristics of the speaker in the particular audio stream to the voice signature of the user previously identified as Jim, conference system 100 associates (at 516) the user identifier of Jim to the particular audio stream.

A user or conference host may manually mute the particular audio stream and/or other audio streams of the second conference after the introductory phase of the second conference is complete. Alternatively, conference system 100 may automatically mute (at 518) the particular audio stream and/or the other audio streams when the introductory phase is complete or when the host of the second conference begins speaking or indicates that the conference has formally commenced.

Conference system 100 analyzes (at 520) the active audio stream of the second conference which, after the muting (at 518) of the audio streams, includes an unmuted audio stream of the second conference. The speaker in the active audio stream states "Jim, do you have the updated data?".

Conference system 100 detects (at 522) the identifier Jim that is associated with the muted particular audio stream. Conference system 100 further analyzes the context surrounding the mention of the identified participant (e.g., Jim), and classifies (at 524) the context as a question or prompt that induces the identified participant to reply or speak with a threshold amount of certainty (e.g., greater than 50% change of the identified participant speaking). Accordingly, conference system 100 automatically unmutes (at 526) the particular audio stream in response to the detected association between the participant identifier of Jim and the particular audio stream and further in response to classifying the context as a question or prompt that induces the identified participant to reply or speak. Conference system 100 may automatically mute all other audio streams of the second conference so as to not interfere with the particular audio stream. In some example embodiments, conference system 100 may leave the audio stream of the current speaker unmuted, and/or may automatically mute the particular audio stream after the reply from the identified user Jim is complete or after no dialog is detected in the particular audio stream after a specified amount of time (e.g., 5 seconds).

Figure 6:
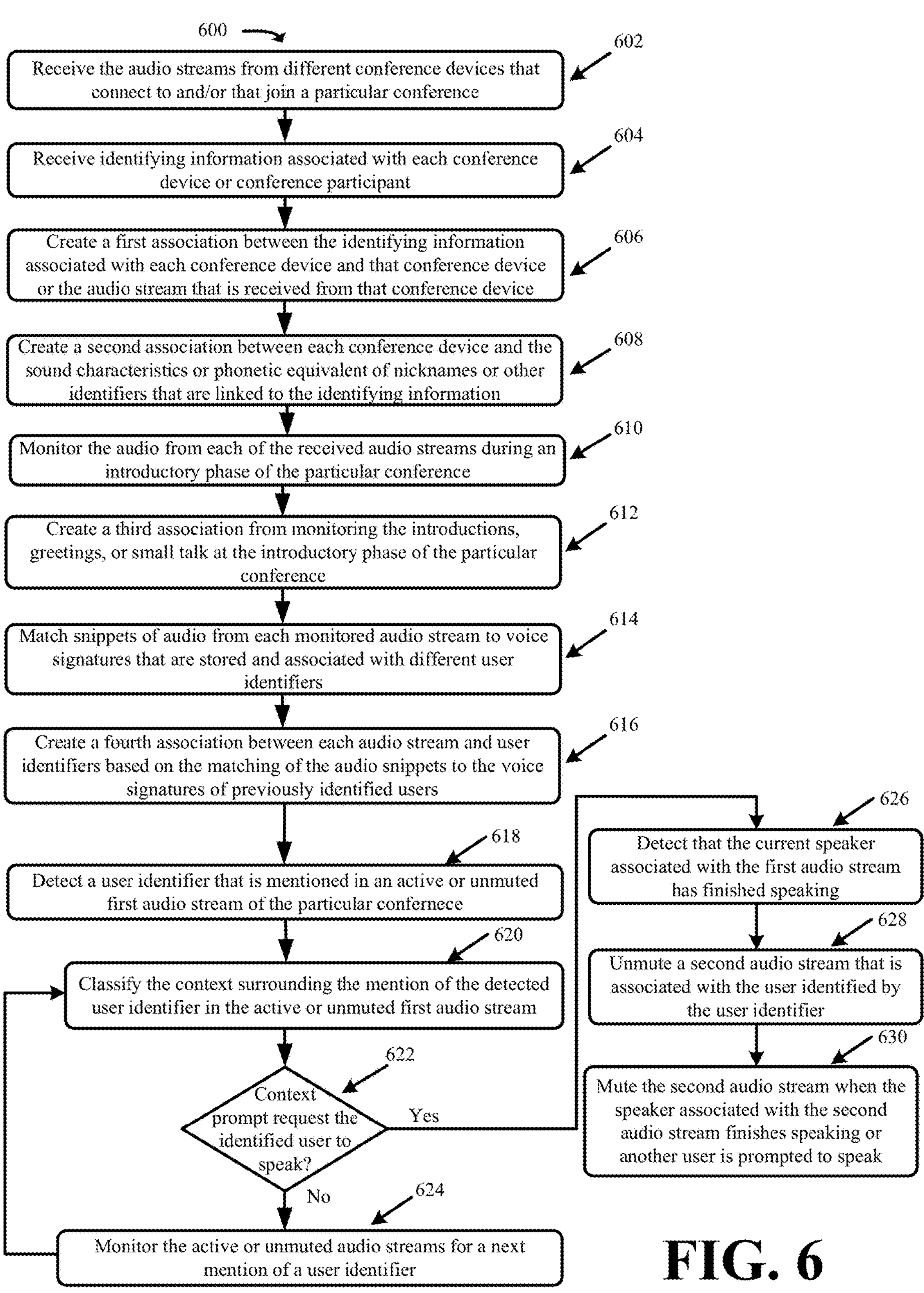
FIG. 6 presents a process for performing the automatic muting and unmuting of conference participants in accordance with some embodiments presented herein.

FIG. 6 presents a process 600 for performing the automatic muting and unmuting of conference participants in accordance with some embodiments presented herein. Process 600 is implemented by conference system 100.

Process 600 includes receiving (at 602) the audio streams from different conference devices 101 that connect to and/or that join a particular conference. In some example embodiments, conference service provider 103 may be configured to provide the audio streams or the combined active audio stream from unmuted conference devices 101 to conference system 100. In some other example embodiments, conference system 100 is integrated directly as part of conference service provider 103, and has direct access to the audio streams as they are uploaded to conference service provider 103. Accordingly, conference system 100 has access to at least a first audio stream associated with a first conference device and a second audio stream associated with a second conference that connects to or joins the particular conference. The audio streams may also be associated with corresponding video streams. Accordingly, conference system 100 may receive (at 602) a video stream and an audio stream from some of conference devices 101.

Process 600 includes receiving (at 604) identifying information associated with each conference device 101 or conference participant. The identifying information may include a name or other textual identifier for identifying a conference participant to the other conference participants. Each user may enter their name prior to joining the particular conference, and the name of each conference participant may be presented next to a window or icon of each conference participant in a user interface. The names may also be provided to conference system 100. In some example embodiments, the identifying information may include an email address, username, login credentials, or another identifier that a conference participant uses to access the particular conference. In some embodiments, the identifying information is a name or other identifier stored in an account or profile of a conference participant and that is accessed upon the conference participant logging in or otherwise requesting to join the particular conference. In some embodiments, the identifying information is a conference device signature that uniquely identifies the conference device and/or the user associated with the uniquely identified conference device. The conference device signature of a particular conference device 101 may include two or more identifiers for different hardware and/or software of the particular conference device 101. The conference device signature may uniquely identify the particular conference device 101, the speaker that uses that particular conference device 101, or may be used to access the account or profile of a conference participant and to obtain additional identifying information about the conference device 101 or the associated user.

Process 600 includes creating (at 606) a first association between the identifying information associated with each conference device 101 and that conference device 101 or the audio stream that is received (at 602) from that conference device 101. Creating (at 606) the first association may include performing a text-to-speech conversion of the name or identifier provided as the identifying information for a particular conference participant or a particular audio stream, and using the sound characteristics or phonetic equivalent of that name or identifier to identify when the particular conference participant is mentioned. For instance, first conference device 101 joins the particular conference using the name of "Larry". Conference system 100 performs a text-to-speech conversion of the name and stores the association between the sound characteristics or phonetic conversion of "Larry" to first conference device 101-1, the user associated with first conference device 101-1, and/or the audio stream associated with first conference device 101-1 or the associated user. Creating (at 606) the first association may include matching the conference device signature of each conference device 101 to a name or identifier of a different user, and associating the name or identifier to that conference device 101 or the audio stream that is received (at 602) from that conference device 101.

Process 600 includes creating (at 608) a second association between each conference device 101 and the sound characteristics or phonetic equivalent of nicknames or other identifiers that are frequently associated with the identifying information. Conference system 100 performs a lookup of the identifying information against a library or a user profile that is accessed with the received (at 604) identifying information, and creates (at 608) the second association that links the sound characteristics of nicknames or other common identifiers for the received name to the conference device 101, user that is associated with the received name, or the audio stream associated with the conference device 101 or identified user. For instance, second conference device 101-2 joins the particular conference using the email address of "charles.x@company.com". Conference system 100 accesses an account or profile associated with the email address. The account or profile may store common nicknames or identifiers with which the user associated with the email address is addressed. For instance, the account or profile for "charles.x@company.com" may contain the nicknames of "Chuck" and "Charlie". Conference system 100 generates or obtains the sound characteristics or phonetic equivalent for each stored nickname and creates (at 608) the second associations based on these alterative identifiers for second conference device 101-2, the user associated with second conference device 101-2, or the audio stream associated with second conference device 101-2 or the identified user.

Process 600 includes monitoring (at 610) the audio from each of the received (at 602) audio streams during an introductory phase of the particular conference. For instance, the particular conference may be scheduled to start at a specific time or once all invited or registered participants have joined. Prior to that scheduled start, the participants may join, introduce themselves, greet one another, or may engage in small talk. Conference system 100 monitors (at 610) the audio for specific introductions, greetings, or small talk that identify or associate specific users to specific audio streams. Additionally, if an audio stream is associated or provided with a video stream, conference system 100 may perform facial recognition on the images provided in that video stream to determine if a speaker's face matches to a stored image of a recognized or known user.

Process 600 includes creating (at 612) a third association from monitoring (at 610) the introductions, greetings, or small talk at the introductory phase of the particular conference. Conference system 100 detects when a user identifier is spoken. A user identifier is typically a word that does not have a dictionary definition or matches to a name within a directory or list. Conference system 100 further monitors the context around the user identifier to determine if the user identifier identifies the current speaker or identifies a speaker that is associated with a different audio stream. For instance, conference system 100 creates (at 612) the third association between the name "Jim" and a first audio stream when monitoring the first audio stream and detecting the spoken phrase "Hi everyone, this is Jim". Conversely, conference system 100 creates (at 612) the third association between the name "Jill" and a second audio stream when detecting the spoken phrase "Hi Jill, how are you?" in the first audio stream and detecting the reply "I'm fine." in the second audio stream that becomes active immediately after the first audio stream. Conference system 100 may use AI/ML classifier 300 and/or one or more AI/ML techniques to detect the user identifier and to determine whether the context surrounding the user identifier identifies the speaker or another party that replies to the speaker. The facial recognition performed on a corresponding video stream may be used to supplement, verify, or separately establish the third association. For instance, the greeting in a first audio stream may identify a name that matches to two known users. A speaker in a second audio stream responds to the greeting, and conference system 100 performs facial recognition on a video stream that is associated with the second audio stream to visually identifier the speaker and select between the two known users. If a user joins the particular conference and does not speak during the introductory phase, conference system 100 may perform the facial recognition on a video stream provided by conference device 101 of that user in order to create (at 612) the third association between the audio stream provided by that conference device 101 and the name or identifier of the user identified via the facial recognition.

In some cases, users are not identified by names or other identifiers. In some such cases, conference system 100 may be unable to extract identifiers for all connected users during the introductory period of the particular conference. Additionally, multiple users may use one conference device 101 to participate in the particular conference such that multiple user identifiers may be associated with the same audio stream or conference device 101. Accordingly, conference system 100 may use voice signatures for identification and association of one or more user identifiers to the audio streams.

Process 600 includes matching (at 614) snippets of audio from each monitored (at 610) audio stream to voice signatures that are stored and associated with different user identifiers. In some embodiments, conference system 100 may record sound snippets of different identified users speaking in prior conferences and may associate the sound snippets to the identifiers associated with the identified users. In some such embodiments, conference system 100 may analyze the sound snippets to extract or define a voice signature based on one or more of the speaker's pitch, tone or intonation, frequency, intensity, accent, manner of speech, and/or other voice characteristics, and may associate the voice signatures to the identifiers associated with the identified users. Conference system 100 may match (at 614) snippets from the different audio streams of the particular conference to the recorded sound snippets or voice signatures. For instance, a speaker associated with a third audio stream may speak the phrase "Hi, hope everyone is ready to start." Conference system 100 may match the pitch, tone, frequency, intensity, and/or other voice characteristics of the speaker to a voice signature of a user previously identified as "Jane". In some example embodiments, conference system 100 may require users to provide an audio snippet prior to joining the particular conference, and may use that audio snippet to match each user to a voice signature that is associated with a user identifier. For instance, conference system 100 may prompt a conference participant to state their name prior to joining the particular conference.

Process 600 includes creating (at 616) a fourth association between each audio stream and user identifiers based on the matching (at 614) of the audio snippets to the voice signatures of previously identified users. In some embodiments, conference system 100 may be unable to create one or more of the first, second, third, and fourth associations for each audio stream, connected conference device 101, or user associated with each audio stream. However, a single association may be sufficient to perform the automated audio control of the audio streams.

Once the particular conference formally commences (e.g., the introductory phase ends), one or more of the particular conference audio streams may be manually or automatically muted. The conference host may mute the audio streams of all conference participants while keeping the host audio stream active and unmuted. In some embodiments, conference system 100 identifies the audio stream of the host or the current speaker and mutes all other audio streams.

Process 600 includes detecting (at 618) a user identifier that is mentioned in an active or unmuted first audio stream of the particular conference once the particular conference formally commences or once the automatic muting and unmuting functionality is enabled. Detecting (at 618) the user identifier includes detecting the sound characteristics or phonetic equivalent for one of the identifiers that has been associated to one of the audio streams of the particular conference via the created first, second, third, or fourth associations. For instance, the speaker may state "Bob has left the company, so I would like to introduce John who is taking over." In this example, the sound characteristics for the identifier "Bob" may not be associated with any of the audio streams since that identifier was not one of the received (at 604) identifying information, associated nicknames, mentions during the introductory phase, or matched (at 614) voice signatures. However, the sound characteristics for the identifier "John" may have been associated with one of the audio streams based on the received (at 604) identifying information, associated nicknames, mentions during the introductory phase, or matched (at 614) voice signatures.

Process 600 includes classifying (at 620) the context surrounding the mention of the detected (at 618) user identifier in the active or unmuted first audio stream. The context includes the audio before and after the mention of the user identifier. For instance, conference system 100 may sample two seconds of the first audio stream prior to the mention of the user identifier and may sample five seconds of the first audio stream after the mention of the user identifier.

Classifying (at 620) the context may include differentiating between questions, instructions, prompts, and/or other requests for the user identified by the user identifier to speak and mentions of the user identifier that do not invoke a response from that user. Conference system 100 performs the classification (at 620) based on a voice analysis. For instance, the speaker's tone may be used to differentiate between a question and a statement. Conference system 100 may also use one or more AI/ML techniques to perform the classification (at 620). For instance, conference system 100 may perform a speech-to-text conversion of the context, and the AI/ML techniques may perform natural language processing of the converted text to classify (at 620) the context as a speaking prompt or as a declaratory statement. The AI/ML techniques may identify questioning words, instructions, commands, or direction in the context that prompt the identifier user to speak. The phrase "Your turn to present Bob." include an instruction, command, or direction for the identified user (e.g., Bob), and is therefore classified (at 620) a speaking prompt or request.

Process 600 includes determining (at 622) whether the context prompts or requests the user identified by the user identifier to speak. The determination (at 622) is based on the classification (at 620) of the context as a question, instruction, prompt, and/or other request to speak.

Process 600 includes monitoring (at 624) the active or unmuted audio streams for a next mention of a user identifier in response to determining (at 622—No) that the context is not a speaking prompt or request. In other words, conference system 100 performs no automated action solely based on detecting (at 618) the user identifier without the additional contextual corroboration that the user identifier was mentioned or referenced as part of a prompt or request for the identified user to speak.

Process 600 includes detecting (at 626) that the current speaker associated with the first audio stream has finished speaking in response to determining (at 624—Yes) that the context is a speaking prompt or request. For instance, conference system 100 detects (at 626) when the first audio stream becomes silent or when the question or prompt posed by the current speaker is complete.

Process 600 includes unmuting (at 628) a second audio stream that is associated with the user identified by the user identifier. As part of unmuting (at 628) the second audio stream, conference system 100 may provide a visible or audible notification that alerts the user that they have been automatically unmuted. For instance, conference system 100 display a graphic or animation in the conference user interface or plays a sound on the conference device of the identified user an indication they have been unmuted.

Conference system 100 may unmute (at 628) the second audio stream by sending a command to the conference device 101 that generates the second audio stream, or by directly controlling audio from the second audio stream via conference service provider 103. In some embodiments, conference system 100 invokes an API call that enables or activates the second audio stream, wherein enabling or activating the second audio stream includes integrating or multiplexing the audio from the second audio stream as part of the composite or active audio stream that is distributed to all conference devices 101 that are connected to the particular conference.

In some embodiments, unmuting (at 628) the second audio stream includes automatically muting the first audio stream that prompted the second audio stream to become active so that the audio from the first audio stream does not interfere with the audio from the second audio stream. In some other embodiments, the first audio stream remains unmuted to allow for conversation between users associated with the first and second audio streams.

Process 600 includes muting (at 630) the second audio stream when the speaker associated with the second audio stream finishes speaking or when another user that is associated with another audio stream of the particular conference is prompted or requested to speak. Conference system 100 may automatically return control to the host or the speaker associated with the first audio stream. In some embodiments, conference system 100 waits one or more seconds after there is more detected dialog in the second audio stream before muting (at 630) the second audio stream.

Conference system 100 may provide additional audio control functionality to further improve and automate control over conference audio. In some embodiments, conference system 100 provides automated host controls for a conference.

Figure 7:
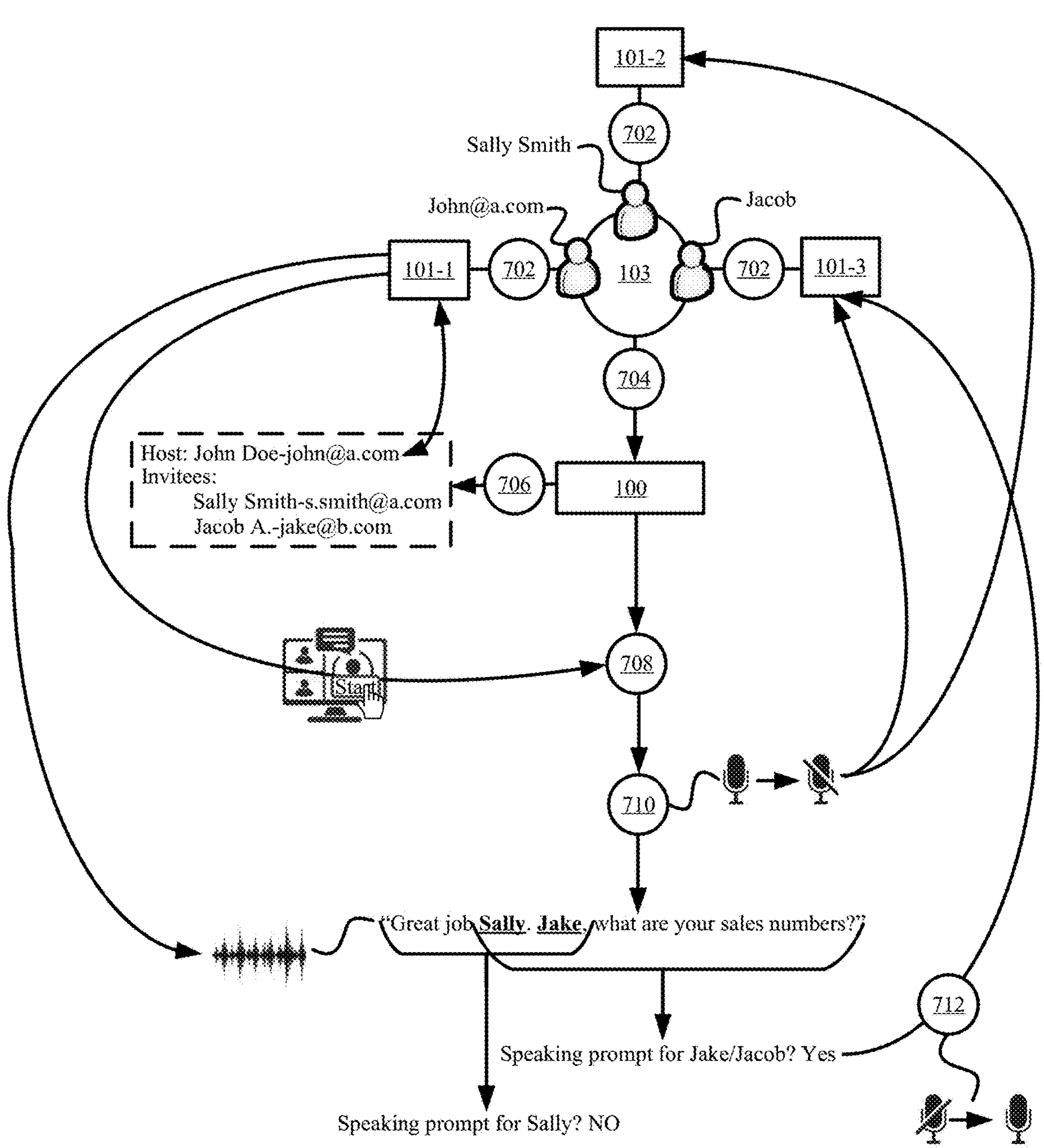
FIG. 7 illustrates an example of automating audio control for a conference host in accordance with some embodiments presented herein.

FIG. 7 illustrates an example of automating audio control for a conference host in accordance with some embodiments presented herein. Multiple conference devices 101 join (at 702) a conference that is controlled by conference system 100.

Conference system 100 receives (at 704) the audio streams from each connected conference device 101 and determines (at 706) that a first audio stream from first conference device 101-1 is associated with the conference host. In some example implementations, the host determination is based on identifying information provided by each conference device 101 or an association between the conference creator and first conference device 101-1. For instance, each conference device 101 provides login information when joining (at 702) the conference, and the login information from first conference device 101-1 may be linked to the creator or host of the conference. In some other embodiments, conference system 100 determines (at 706) that the first audio stream is associated with the conference host from monitoring the audio during the introductory phase of the conference. For instance, conference system 100 analyzes the audio for certain keywords or phrases such as "Let's begin" or "I'm going to start".

Conference system 100 detects (at 708) when the conference formally begins based on input from the conference host. The input may include audio with the keywords or phrases that indicate the end of the introductory phase and the formal start of the conference. The input may also include a button press or other command that is issued from first conference device 101. Conference system 100 may also detect (at 708) the start of the conference once all participants have joined the conference or a timer associated with the introductory phase ends.

Conference system 100 automatically mutes (at 710) the audio streams associated with conference devices 101 that are not associated with the conference host (e.g., mute all audio streams except the first audio stream) in response to detecting (at 708) that the conference has formally commenced. Conference system 100 automatically unmutes (at 712) individual muted audio streams when the users associated with those audio streams are prompted or requested to speak by the conference host or other users that are unmuted. Conference system 100 also automatically mutes the unmuted audio streams when the associated speaker finishes speaking. In this manner, the conference host is freed from having to manually mute and unmute each individual audio stream over the course of the conference since conference system 100 assumes automated control over the conference audio. Conference system 100 automatically removes background and/or unnecessary audio from the main conference feed so that all participants receive clear and non-interfered audio.

In some example embodiments, conference system 100 permits users to manually unmute and mute their respective audio streams. In some such embodiments, conference system 100 may monitor an audio stream that is manually unmuted and may automatically mute that audio stream once the dialog from that audio stream ends.

In some other embodiments, users may request to be unmuted by pressing a button or providing other input. Conference system 100 receives the request, and provides a prompt to the conference host to notify the conference host of the user requesting to speak. Rather than have the conference host manually identify and unmute the audio stream of the requesting user, the conference host may verbally prompt or request the user to speak, and conference system 100 may automatically unmute the audio stream of the requesting user. For instance, a user identified as Bob may issue a request to speak from their conference device 101, and the conference host or current speaker may state "Go ahead, Bob." Conference system 100 detects the user identifier (e.g., Bob) and the associated context as a prompt for Bob to speak and unmutes the audio stream associated with Bob's conference device 101.

The embodiments presented above are not limiting, as elements in such embodiments may vary. It should likewise be understood that a particular embodiment described and/or illustrated herein has elements which may be readily separated from the particular embodiment and optionally combined with any of several other example embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things ("IoT") devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and nonvolatile, removable and non-removable media implemented in any method or technology for storage of information such as computer-readable instructions, data structures, program modules, or other data. Computer storage media can include, but is not limited to, random access memory ("RAM"), read only memory ("ROM"), electrically erasable programmable ROM ("EEPROM"), flash memory, or other memory technology, compact disk ROM ("CD-ROM"), digital versatile disks ("DVDs") or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

What is claimed is:

1. A computer-implemented method for automatically controlling audio in a conference, the computer-implemented method comprising:

receiving, at a conference system, a plurality of audio streams for the conference;

detecting an audio sample in one of the plurality of audio streams that indicates a formal start of the conference;

in response to detecting the audio sample, muting the plurality of audio streams except for a first audio stream of the plurality of audio streams that is associated with a host of the conference;

detecting, by execution of the conference system, an identifier that is mentioned in an audio of the first audio stream and that identifies a user that is associated with a second audio stream of the plurality of audio streams;

retrieving context that is spoken before and after the identifier is mentioned in the audio of the first audio stream;

classifying, by execution of the conference system, the context associated with the identifier as a statement or question that is directed to the user that is identified by the identifier and that invokes a response from the user without including a command or signal to unmute the user or the second audio stream; and unmuting, by execution of the conference system, the second audio stream in response to classifying the context as the statement or question that invokes the response from the user without including the command or signal to unmute the user or the second audio stream.

2. The computer-implemented method of claim 1, wherein retrieving the context comprises:

extracting a snippet of the audio from the first audio stream that is after a mention of the identifier in the audio of the first audio stream.

3. The computer-implemented method of claim 1, wherein detecting the identifier comprises:

determining that the identifier corresponds to a name or value that is associated with the second audio stream.

4. The computer-implemented method of claim 1, further comprising:

detecting a second identifier that is mentioned in the audio of the first audio stream, wherein the second identifier is different than the identifier, and wherein the second identifier is associated with a participant of a third audio stream of the plurality of audio streams;

determining that the second identifier is mentioned in the audio of the first audio stream without context for invoking a response from the participant; and retaining the third audio stream in a muted state in response to the second identifier being mentioned in the audio of the first audio stream without the context for invoking the response from the participant.

5. The computer-implemented method of claim 1, further comprising:

monitoring audio from the second audio stream after unmuting the second audio stream; and muting the second audio stream after dialog in the audio from the second audio stream ends.

6. The computer-implemented method of claim 1, wherein unmuting the second audio stream comprises:

analyzing the audio from the first audio stream;

delaying the unmuting of the second audio stream until a speaker speaking in the first audio stream finishes speaking;

determining that the speaker in the first audio stream stops speaking; and enabling audio from the second audio stream without user input in response to the classifying the context and determining that the speaker in the first audio stream stops speaking.

7. The computer-implemented method of claim 6, further comprising:

muting the first audio stream without user input in response to determining that the speaker in the first audio stream stops speaking.

8. The computer-implemented method of claim 1, further comprising:

receiving a user identifier that identifies the user that is associated with the second audio stream, wherein the user identifier is different than the identifier;

determining one or more identifiers that are linked to the user identifier; and determining that the identifier is linked to the second audio stream based on the identifier matching one of the one or more identifiers.

9. The computer-implemented method of claim 1, further comprising:

detecting that the identifier is mentioned in an audio of a third audio stream of the plurality of audio streams during an introductory phase of the conference that precedes the formal start of the conference and prior to said detecting the identifier that is mentioned in the audio of the first audio stream;

detecting that the second audio stream becomes active after the identifier is mentioned in the audio of the third audio stream; and associating the identifier to the second audio stream in response to detecting that the second audio stream becomes active after the identifier is mentioned in the audio of the third audio stream.

10. The computer-implemented method of claim 1, further comprising:

detecting a user introduction in the second audio stream prior to detecting the identifier that is mentioned in the audio of the first audio stream, wherein the user introduction comprises dialog stating the identifier represents the user associated with the second audio stream; and associating the identifier to the second audio stream in response to detecting the user introduction.

11. The computer-implemented method of claim 1, further comprising:

receiving the identifier in a textual format in response to the user joining the conference;

performing a text-to-speech conversion of the identifier in the textual format to obtain sound characteristics of the identifier; and wherein detecting the identifier that is mentioned in the audio of the first audio stream comprises matching a snippet of the audio of the first audio stream to the sound characteristics of the identifier.

12. The computer-implemented method of claim 1, further comprising:

receiving identifying information for each of the first audio stream and the second audio stream as part of receiving the plurality of audio streams;

creating a first association between the identifying information for the first audio stream and the first audio stream and a second association between the identifying information for the second audio stream and the second audio stream;

monitoring the audio from the first audio stream and an audio from the second audio stream during an introductory phase of the conference that precedes the formal start of the conference;

creating a third association between the first audio stream and a first user identifier that is mentioned during the introductory phase as an introduction by a speaker of the first audio stream or as a reply by the speaker of the first audio stream to a greeting in a different audio stream that precedes the reply by the speaker of the first audio stream and a fourth association between the second audio stream and a second user identifier that is mentioned during the introductory phase as an introduction by the speaker of the second audio stream or as a reply by the speaker of the second audio stream to a greeting in a different audio stream that precedes the reply by the speaker of the second audio stream; and wherein detecting the identifier that is mentioned in the audio of the first audio stream comprises:

comparing the identifier against the second association and the fourth association created for the second audio stream; and determining that the identifier is associated to the second audio stream based on the identifier matching to one of the identifying information in the second association or the second user identifier in the fourth association.

13. The computer-implemented method of claim 1, further comprising:

embedding an audio controller into the conference system;

performing, by the audio controller, an audio multiplexing that combines unmuted audio streams of the conference including the first audio stream without the second audio stream into an active audio feed;

presenting the active audio feed without the second audio stream to each device that is connected to the conference; and wherein unmuting the second audio stream comprises:

performing, by the audio controller, the audio multiplexing to combine the second audio stream with other unmuted audio streams of the conference into the active audio feed; and presenting the active audio feed with the second audio stream to each device that is connected to the conference.

14. The computer-implemented method of claim 1, wherein unmuting the second audio stream comprises:

retaining other audio streams of the conference in a muted state including a third audio stream when unmuting the second audio stream.

15. The computer-implemented method of claim 14, wherein retaining the other audio streams in the muted state comprises:

retaining the first audio stream in an unmuted state while muting the third audio stream to allow for conversation between a last active speaker associated with the first audio stream and a prompted user associated with the second audio stream.

16. The computer-implemented method of claim 1, further comprising:

determining a first device signature for the first audio stream based on a first set of hardware and software identifiers associated with devices used to capture and present the first audio stream, and a second device signature for the second audio stream based on a second set of hardware and software identifiers associated with devices used to capture and present the second audio stream;

determining that the first device signature uniquely identifies a first user and the second device signature uniquely identifies a second user; and wherein unmuting the second audio stream comprises:

selecting the second audio stream to unmute based on the identifier matching a user identifier that is associated with the second device signature.

17. The computer-implemented method of claim 16, further comprising:

associating a plurality of different identifiers to the second audio stream based on a first identifier that is provided with the second audio stream and that is presented to other conference participants, a second identifier that is associated with a voice signature that matches to voice characteristics of a speaker in the second audio stream, a third identifier that the conference system automatically detects for the user based on a spoken name and surrounding context in the first audio stream or the second audio stream, and a fourth identifier that is linked to the second device signature; and matching the identifier that is mentioned in the audio of the first audio stream to one of the plurality of different identifiers that are associated to the second audio stream.

18. The computer-implemented method of claim 1, wherein at least one audio stream of the plurality of audio streams for the conference is unmuted during an introductory phase of the conference that is before the formal start of the conference.

19. A conference system for automatically controlling audio in a conference, the conference system comprising:

one or more hardware processors configured to:

receive a plurality of audio streams for the conference;

detect an audio sample in one of the plurality of audio streams that indicates a formal start of the conference;

in response to detecting the audio sample, mute the plurality of audio streams except for a first audio stream of the plurality of audio streams that is associated with a host of the conference;

detect an identifier that is mentioned in an audio of the first audio stream and that identifies a user that is associated with a second audio stream of the plurality of audio streams;

retrieve context that is spoken before and after the identifier is mentioned in the audio of the first audio stream;

classify the context associated with the identifier as a statement or question that is directed to the user that is identified by the identifier and that invokes a response from the user without including a command or signal to unmute the user or the second audio stream; and unmute the second audio stream in response to classifying the context as the statement or question that invokes the response from the user without including the command or signal to unmute the user or the second audio stream.

20. A non-transitory computer-readable medium storing program instructions that, when executed by one or more hardware processors of a conference system, cause the conference system to perform operations comprising:

receive a plurality of audio streams for a conference;

detect an audio sample in one of the plurality of audio streams that indicates a formal start of the conference;

in response to detecting the audio sample, mute the plurality of audio streams except for a first audio stream of the plurality of audio streams that is associated with a host of the conference;

detect an identifier that is mentioned in an audio of the first audio stream and that identifies a user that is associated with a second audio stream of the plurality of audio streams;

retrieve context that is spoken before and after the identifier is mentioned in the audio of the first audio stream;

classify the context associated with the identifier as a statement or question that is directed to the user that is identified by the identifier and that invokes a response from the user without including a command or signal to unmute the user or the second audio stream; and unmute the second audio stream in response to classifying the context as the statement or question that invokes the response from the user without including the command or signal to unmute the user or the second audio stream.

* * * * *